US012726276B2

(12) United States Patent
Chang et al.

(10) Patent No.: US 12,726,276 B2
(45) Date of Patent: Sep. 1, 2026

(54) ACTIVE OPTICAL CABLE SYSTEM, ACTIVE OPTICAL CABLE TRANSMITTING APPARATUS, AND ACTIVE OPTICAL CABLE RECEIVING APPARATUS

(71) Applicant: JESS-LINK PRODUCTS CO., LTD., New Taipei City (TW)

(72) Inventors: Shu-Mei Chang, New Taipei City (TW); Chi-Hsien Sun, New Taipei City (TW); Chieh-Ming Cheng, New Taipei City (TW)

(73) Assignee: JESS-LINK PRODUCTS CO., LTD., New Taipei City (TW)

( * ) Notice: Subject to any disclaimer, the term of this patent is extended or adjusted under 35 U.S.C. 154(b) by 212 days.

(21) Appl. No.: 18/824,116

(22) Filed: Sep. 4, 2024

(65) Prior Publication Data

US 2026/0031915 A1 Jan. 29, 2026

(30) Foreign Application Priority Data

Jul. 29, 2024 (TW) ................................ 113128090

(51) Int. Cl.
*H04B 10/50* (2013.01)
*H04B 10/2581* (2013.01)
(Continued)

(52) U.S. Cl.
CPC ....... *H04B 10/616* (2013.01); *H04B 10/2581* (2013.01); *H04B 10/503* (2013.01); *H04Q 11/0071* (2013.01)

(58) Field of Classification Search
None
See application file for complete search history.

(56) References Cited

U.S. PATENT DOCUMENTS 8,750,657 B2 * 6/2014 Levy .................... G02B 6/4292 385/14
10,333,626 B2 * 6/2019 Dutton ................ H04B 10/114
(Continued)

FOREIGN PATENT DOCUMENTS

TW 201512726 A 4/2015
TW 201836296 A 10/2018
TW M650960 U 2/2024

OTHER PUBLICATIONS

Office Action dated Feb. 4, 2025 of the corresponding Taiwan patent application No. 113128090.

*Primary Examiner* — Jai M Lee
(74) *Attorney, Agent, or Firm* — HDLS IPR SERVICES; Chun-Ming Shih

(57) ABSTRACT

An active optical cable system is applied to a transmitting-end electronic apparatus and a receiving-end electronic apparatus. The active optical cable system includes an active optical cable transmitting apparatus, an active optical cable receiving apparatus, and an optical fiber. The active optical cable transmitting apparatus includes a transmitting-end signal-splitting processor and a transmitting-end vertical cavity surface emitting laser circuit. The active optical cable receiving apparatus includes a receiving-end signal-splitting processor and a receiving-end vertical cavity surface emitting laser circuit. The transmitting-end vertical cavity surface emitting laser circuit is connected to the receiving-end vertical cavity surface emitting laser circuit through the optical fiber.

10 Claims, 3 Drawing Sheets

(51) Int. Cl.
*H04B 10/61* (2013.01)
*H04Q 11/00* (2006.01)

(56) References Cited

U.S. PATENT DOCUMENTS

| | | | | |
|---|---|---|---|---|
| 10,855,381 | B2 * | 12/2020 | Sipes, Jr. | H04L 12/10 |
| 11,742,945 | B2 * | 8/2023 | Sun | G01M 11/33 398/38 |
| 11,914,039 | B2 * | 2/2024 | Niinami | G01S 7/4815 |
| 11,936,431 | B2 * | 3/2024 | Aono | H04J 14/0298 |
| 12,411,294 | B2 * | 9/2025 | Sun | H01R 24/64 |
| 2010/0232786 | A1 * | 9/2010 | Aoki | H04J 3/1658 398/19 |
| 2014/0353530 | A1 * | 12/2014 | Chang-Hasnain | H10F 77/146 250/552 |
| 2023/0266546 | A1 | 8/2023 | Ger et al. | |
| 2023/0354541 | A1 | 11/2023 | Cole et al. | |

* cited by examiner

ACTIVE OPTICAL CABLE SYSTEM, ACTIVE OPTICAL CABLE TRANSMITTING APPARATUS, AND ACTIVE OPTICAL CABLE RECEIVING APPARATUS

BACKGROUND OF THE DISCLOSURE

Technical Field

The present disclosure relates to an optical cable system, an optical cable transmitting apparatus, and an optical cable receiving apparatus, and especially relates to an active optical cable system, an active optical cable transmitting apparatus, and an active optical cable receiving apparatus.

Description of Related Art

In recent years, the rapid development of the artificial intelligence applications has led to the rapid development of the high-speed data transmission and the computing technologies. In order to meet the requirement for the high-speed data transmission in the field of the artificial intelligence applications, the active optical cable has become one of the mainstream technologies for the data transmission. In the case of the connecting transmission between the artificial intelligence network card and the switch, the active optical cable technology with the laser driver having the electro-absorption modulated laser (commonly referred to as EML) single-mode optical module or the directly modulated laser (commonly referred to as DML) single-mode optical module is currently used.

However, the above mentioned electro-absorption modulated laser single-mode optical module or the directly modulated laser single-mode optical module has the high cost and the high power consumption, and this problem needs to be solved urgently.

SUMMARY OF THE INVENTION

In order to solve the above-mentioned problems, an object of the present disclosure is to provide an active optical cable system.

In order to solve the above-mentioned problems, another object of the present disclosure is to provide an active optical cable transmitting apparatus.

In order to solve the above-mentioned problems, still another object of the present disclosure is to provide an active optical cable receiving apparatus In order to achieve the object of the present disclosure mentioned above, the active optical cable system of the present disclosure is applied to a transmitting-end electronic apparatus and a receiving-end electronic apparatus. The active optical cable system includes an active optical cable transmitting apparatus, an active optical cable receiving apparatus, and an optical fiber. The active optical cable transmitting apparatus is electrically connected to the transmitting-end electronic apparatus. The active optical cable receiving apparatus is electrically connected to the receiving-end electronic apparatus. The active optical cable transmitting apparatus is connected to the active optical cable receiving apparatus through the optical fiber. Moreover, the active optical cable transmitting apparatus includes a transmitting-end signal-splitting processor and a transmitting-end vertical cavity surface emitting laser circuit. The transmitting-end signal-splitting processor is electrically connected to the transmitting-end electronic apparatus. The transmitting-end vertical cavity surface emitting laser circuit is electrically connected to the transmitting-end signal-splitting processor. Moreover, the active optical cable receiving apparatus includes a receiving-end signal-splitting processor and a receiving-end vertical cavity surface emitting laser circuit. The receiving-end signal-splitting processor is electrically connected to the receiving-end electronic apparatus. The receiving-end vertical cavity surface emitting laser circuit is electrically connected to the receiving-end signal-splitting processor. The transmitting-end vertical cavity surface emitting laser circuit is connected to the receiving-end vertical cavity surface emitting laser circuit through the optical fiber. Moreover, the transmitting-end signal-splitting processor is configured to receive M transmitting-end electric signals transmitted by the transmitting-end electronic apparatus through M transmitting-end lanes. The transmitting-end signal-splitting processor and the transmitting-end vertical cavity surface emitting laser circuit are configured to convert the M transmitting-end electric signals into M optical signals. The transmitting-end vertical cavity surface emitting laser circuit is configured to transmit the M optical signals to the receiving-end vertical cavity surface emitting laser circuit through the optical fiber. The receiving-end vertical cavity surface emitting laser circuit and the receiving-end signal-splitting processor are configured to convert the M optical signals into N receiving-end electric signals. The receiving-end signal-splitting processor is configured to transmit the N receiving-end electric signals to the receiving-end electronic apparatus through N receiving-end lanes. The M is a positive integer. The N is a positive integer. The M is not equal to the N; namely, the M fails to be equal to the N.

In order to achieve the another object of the present disclosure mentioned above, the active optical cable transmitting apparatus of the present disclosure is applied to a transmitting-end electronic apparatus, an optical fiber, and an active optical cable receiving apparatus. The active optical cable receiving apparatus includes a receiving-end vertical cavity surface emitting laser circuit. The active optical cable transmitting apparatus includes a transmitting-end signal-splitting processor and a transmitting-end vertical cavity surface emitting laser circuit. The transmitting-end signal-splitting processor is electrically connected to the transmitting-end electronic apparatus. The transmitting-end vertical cavity surface emitting laser circuit is electrically connected to the transmitting-end signal-splitting processor. The transmitting-end vertical cavity surface emitting laser circuit is connected to the receiving-end vertical cavity surface emitting laser circuit through the optical fiber. Moreover, the transmitting-end signal-splitting processor is configured to receive M transmitting-end electric signals transmitted by the transmitting-end electronic apparatus through M transmitting-end lanes. The transmitting-end signal-splitting processor and the transmitting-end vertical cavity surface emitting laser circuit are configured to convert the M transmitting-end electric signals into M optical signals. The transmitting-end vertical cavity surface emitting laser circuit is configured to transmit the M optical signals to the receiving-end vertical cavity surface emitting laser circuit through the optical fiber. The M is a positive integer.

In order to achieve the still another object of the present disclosure mentioned above, the active optical cable receiving apparatus of the present disclosure is applied to a receiving-end electronic apparatus, an optical fiber, and an active optical cable transmitting apparatus. The active optical cable transmitting apparatus includes a transmitting-end vertical cavity surface emitting laser circuit. The active optical cable receiving apparatus includes a receiving-end signal-splitting processor and a receiving-end vertical cavity surface emitting laser circuit. The receiving-end signal-splitting processor is electrically connected to the receiving-end electronic apparatus. The receiving-end vertical cavity surface emitting laser circuit is electrically connected to the receiving-end signal-splitting processor. The transmitting-end vertical cavity surface emitting laser circuit is connected to the receiving-end vertical cavity surface emitting laser circuit through the optical fiber. Moreover, the transmitting-end vertical cavity surface emitting laser circuit transmits M optical signals to the receiving-end vertical cavity surface emitting laser circuit through the optical fiber. The receiving-end vertical cavity surface emitting laser circuit and the receiving-end signal-splitting processor are configured to convert the M optical signals into N receiving-end electric signals. The receiving-end signal-splitting processor is configured to transmit the N receiving-end electric signals to the receiving-end electronic apparatus through N receiving-end lanes. The M is a positive integer. The N is a positive integer. The M is not equal to the N; namely, the M fails to be equal to the N.

The advantage of the present disclosure is to reduce the cost and the power consumption of the active optical cable system.

Please refer to the detailed descriptions and figures of the present disclosure mentioned below for further understanding technologies, methods, and effects and achieving the predetermined purposes of the present disclosure. Further, the purposes, characteristics, and features of the present disclosure may be more deeply and specifically understood. However, the drawings are provided only for references and descriptions and not intended to limit the scope of the present disclosure.

DETAILED DESCRIPTION

In the present disclosure, numerous specific details are provided, to provide a comprehensive understanding of embodiments of the present disclosure. However, those skilled in the art may understand that the present disclosure may be practiced without one or more of these specific details. In other instances, well-known details are not shown or described to avoid obscuring features of the present disclosure. The technical content and the detailed description of the present disclosure are as follows with reference to the figures.

Figure 1:
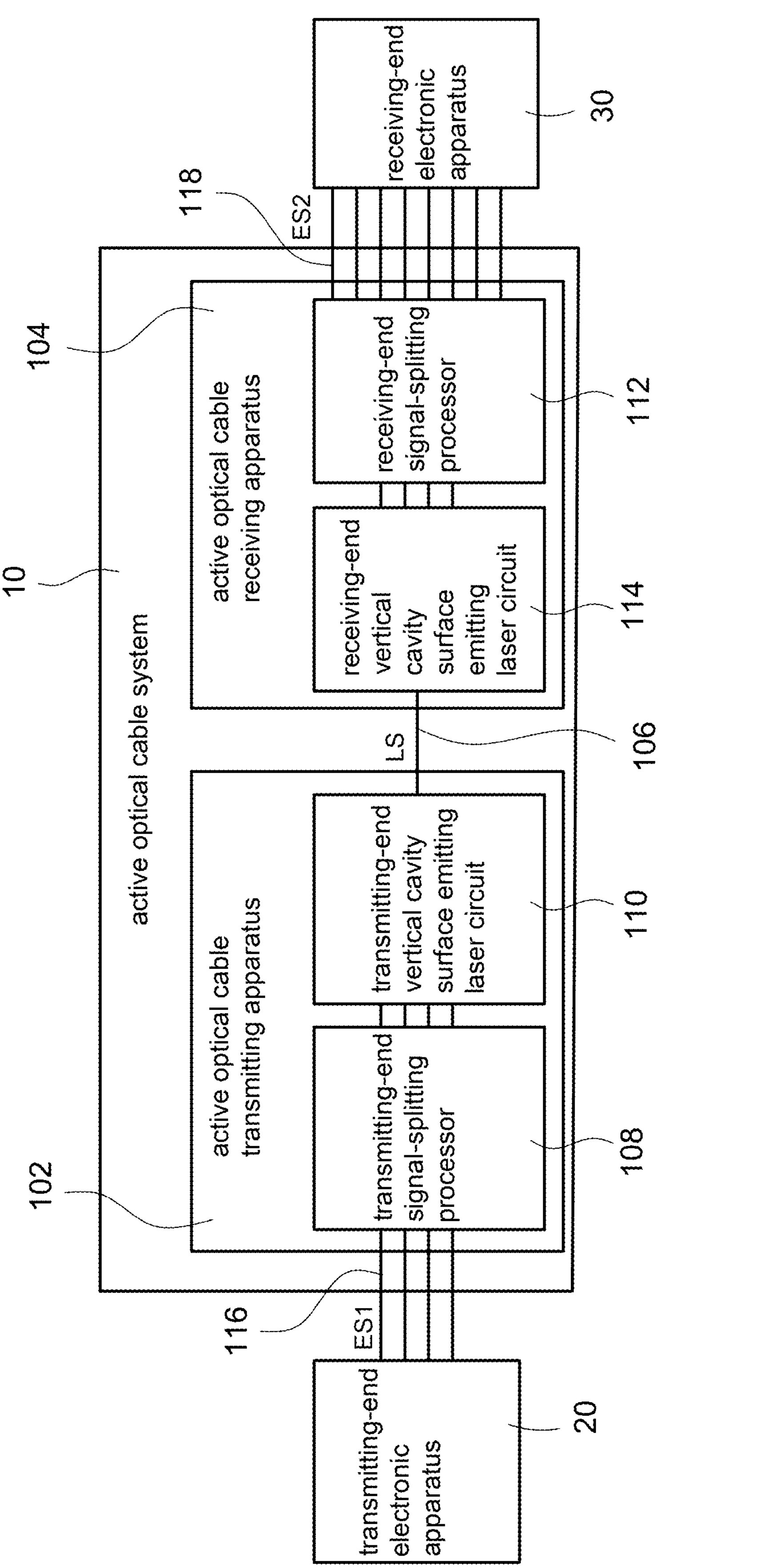
FIG. 1 shows a block diagram of the active optical cable system of the present disclosure.

FIG. 1 shows a block diagram of the active optical cable system 10 of the present disclosure. The active optical cable system 10 of the present disclosure is applied to a transmitting-end electronic apparatus 20 and a receiving-end electronic apparatus 30. The active optical cable system 10 includes an active optical cable transmitting apparatus 102, an active optical cable receiving apparatus 104, and an optical fiber 106. The active optical cable transmitting apparatus 102 includes a transmitting-end signal-splitting processor 108 and a transmitting-end vertical cavity surface emitting laser (commonly referred to as VCSEL) circuit 110. The active optical cable receiving apparatus 104 includes a receiving-end signal-splitting processor 112 and a receiving-end vertical cavity surface emitting laser circuit 114.

The active optical cable transmitting apparatus 102 is electrically connected to the transmitting-end electronic apparatus 20. The active optical cable receiving apparatus 104 is electrically connected to the receiving-end electronic apparatus 30. The active optical cable transmitting apparatus 102 is connected to the active optical cable receiving apparatus 104 through the optical fiber 106. The transmitting-end signal-splitting processor 108 is electrically connected to the transmitting-end electronic apparatus 20 and the transmitting-end vertical cavity surface emitting laser circuit 110. The receiving-end signal-splitting processor 112 is electrically connected to the receiving-end electronic apparatus 30 and the receiving-end vertical cavity surface emitting laser circuit 114. The transmitting-end vertical cavity surface emitting laser circuit 110 is connected to the receiving-end vertical cavity surface emitting laser circuit 114 through the optical fiber 106.

The transmitting-end electronic apparatus 20 is, for example but not limited to, an artificial intelligence network card. The receiving-end electronic apparatus 30 is, for example but not limited to, a switch. In an embodiment of the present disclosure which does not limit the present disclosure, the active optical cable system 10 includes the transmitting-end electronic apparatus 20 and the receiving-end electronic apparatus 30. The active optical cable transmitting apparatus 102 is, for example but not limited to, an octal small form factor pluggable (commonly referred to as OSFP) transmission interface circuit (namely, multi-mode optical module) which includes components of a typical octal small form factor pluggable transmission interface circuit which are not shown in FIG. 1. The active optical cable receiving apparatus 104 is, for example but not limited to, an quad small form factor pluggable-double density (commonly referred to as QSFP-DD) transmission interface circuit (namely, multi-mode optical module) which includes components of a typical quad small form factor pluggable-double density transmission interface circuit which are not shown in FIG. 1.

The transmitting-end signal-splitting processor 108 is, for example but not limited to, a digital signal processor (commonly referred to as DSP), and the receiving-end signal-splitting processor 112 is, for example but not limited to, a digital signal processor; or, the transmitting-end signal-splitting processor 108 is, for example but not limited to, a gearbox circuit, and the receiving-end signal-splitting processor 112 is, for example but not limited to, a gearbox circuit. The transmitting-end vertical cavity surface emitting laser circuit 110 is, for example but not limited to, a vertical cavity surface emitting laser module. The receiving-end vertical cavity surface emitting laser circuit 114 is, for example but not limited to, a vertical cavity surface emitting laser module.

The transmitting-end signal-splitting processor 108 is configured to receive M transmitting-end electric signals ES1 transmitted by the transmitting-end electronic apparatus 20 through M transmitting-end lanes 116. The transmitting-end signal-splitting processor 108 and the transmitting-end vertical cavity surface emitting laser circuit 110 are configured to convert the M transmitting-end electric signals ES1 into M optical signals LS. The transmitting-end vertical cavity surface emitting laser circuit 110 is configured to transmit the M optical signals LS to the receiving-end vertical cavity surface emitting laser circuit 114 through the optical fiber 106. The receiving-end vertical cavity surface emitting laser circuit 114 and the receiving-end signal-splitting processor 112 are configured to convert the M optical signals LS into N receiving-end electric signals ES2. The receiving-end signal-splitting processor 112 is configured to transmit the N receiving-end electric signals ES2 to the receiving-end electronic apparatus 30 through N receiving-end lanes 118. The M mentioned above is a positive integer. The N mentioned above is also a positive integer. The M mentioned above is not equal to the N mentioned above (for example, the M mentioned above is smaller than the N mentioned above).

In an embodiment of the present disclosure which does not limit the present disclosure, the M mentioned above is four. In other words, the octal small form factor pluggable transmission interface circuit (namely, the active optical cable transmitting apparatus 102) has four transmitting-end lanes 116, so that the transmitting-end signal-splitting processor 108 and the transmitting-end vertical cavity surface emitting laser circuit 110 converts four transmitting-end electric signals ES1 into four optical signals LS. If a first data transmission rate of the octal small form factor pluggable transmission interface circuit is 400 Gb/s, then a first data splitting transmission rate of each of the four transmitting-end lanes 116 is 100 Gb/s. Moreover, the first data transmission rate is at least 100 Gb/s.

Continuing from the above, the N mentioned above is eight. In other words, the quad small form factor pluggable-double density transmission interface circuit (namely, the active optical cable receiving apparatus 104) has eight receiving-end lanes 118, so that the receiving-end vertical cavity surface emitting laser circuit 114 and the receiving-end signal-splitting processor 112 converts the four optical signals LS into eight receiving-end electric signals ES2. A second data transmission rate of the quad small form factor pluggable-double density transmission interface circuit is 400 Gb/s, and a second data splitting transmission rate of each of the eight receiving-end lanes 118 is 50 Gb/s.

In summary, when the octal small form factor pluggable transmission interface circuit having the first data transmission rate which is 400 Gb/s is connected to the quad small form factor pluggable-double density transmission interface circuit having the second data transmission rate which is 400 Gb/s, because the octal small form factor pluggable transmission interface circuit has four transmitting-end lanes 116 and each of the four transmitting-end lanes 116 has the first data splitting transmission rate which is 100 Gb/s, and because the quad small form factor pluggable-double density transmission interface circuit has eight receiving-end lanes 118 and each of the eight receiving-end lanes 118 has the second data splitting transmission rate which is 50 Gb/s, the present disclosure requires that the transmitting-end signal-splitting processor 108 and the receiving-end signal-splitting processor 112 convert the signals. In another embodiment of the present disclosure, the active optical cable transmitting apparatus 102 may be a quad small form factor pluggable (commonly referred to as QSFP) transmission interface circuit (namely, multi-mode optical module) having a data transmission rate which is 112 Gb/s.

Figure 2:
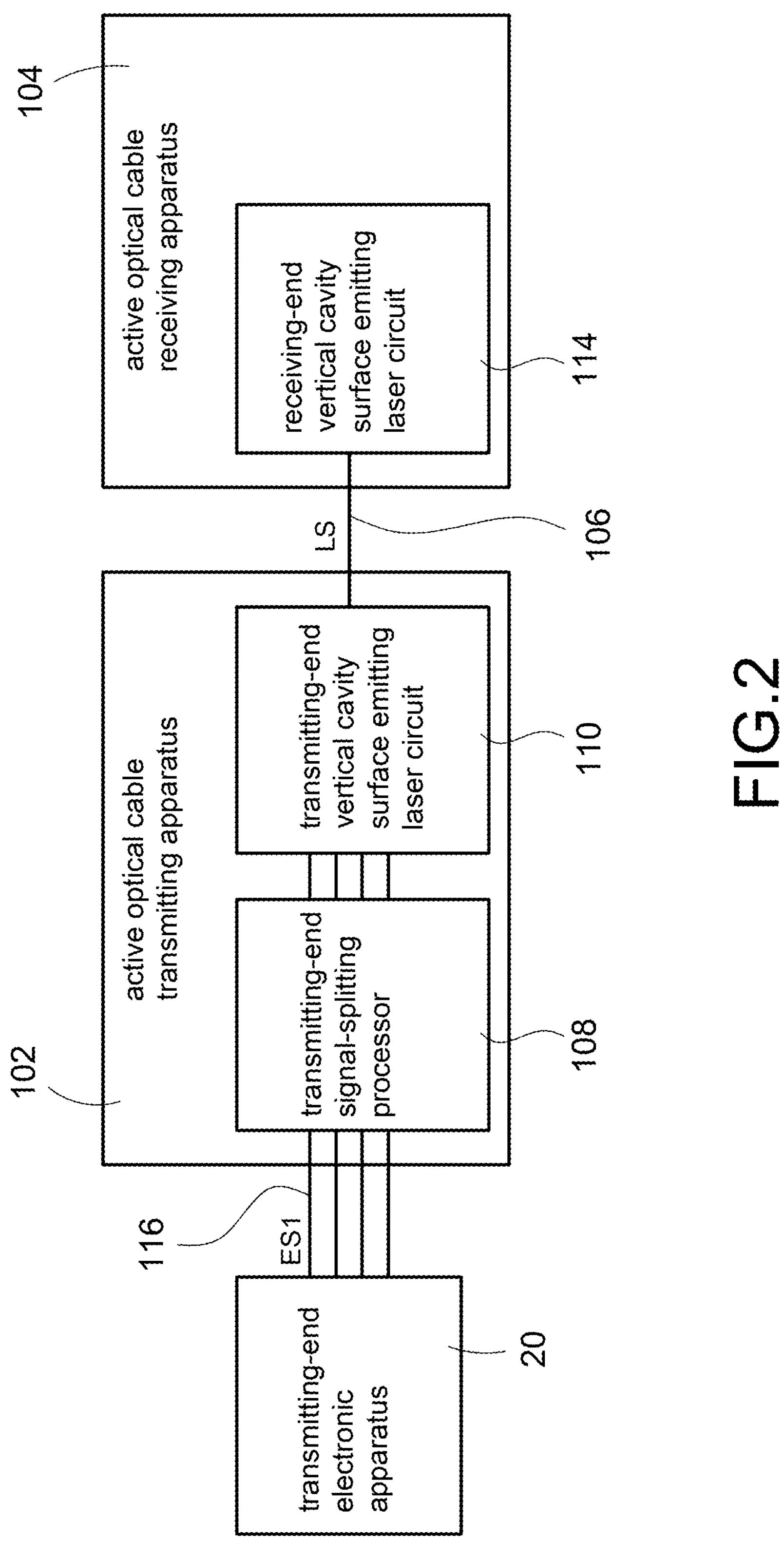
FIG. 2 shows a block diagram of the active optical cable transmitting apparatus of the present disclosure.

FIG. 2 shows a block diagram of the active optical cable transmitting apparatus 102 of the present disclosure. The active optical cable transmitting apparatus 102 of the present disclosure is applied to a transmitting-end electronic apparatus 20, an optical fiber 106, and an active optical cable receiving apparatus 104. The active optical cable receiving apparatus 104 includes a receiving-end vertical cavity surface emitting laser circuit 114. The active optical cable transmitting apparatus 102 includes a transmitting-end signal-splitting processor 108 and a transmitting-end vertical cavity surface emitting laser circuit 110. The transmitting-end signal-splitting processor 108 is electrically connected to the transmitting-end electronic apparatus 20. The transmitting-end vertical cavity surface emitting laser circuit 110 is electrically connected to the transmitting-end signal-splitting processor 108. The transmitting-end vertical cavity surface emitting laser circuit 110 is connected to the receiving-end vertical cavity surface emitting laser circuit 114 through the optical fiber 106.

The transmitting-end signal-splitting processor 108 is configured to receive M transmitting-end electric signals ES1 transmitted by the transmitting-end electronic apparatus 20 through M transmitting-end lanes 116. The transmitting-end signal-splitting processor 108 and the transmitting-end vertical cavity surface emitting laser circuit 110 are configured to convert the M transmitting-end electric signals ES1 into M optical signals LS. The transmitting-end vertical cavity surface emitting laser circuit 110 is configured to transmit the M optical signals LS to the receiving-end vertical cavity surface emitting laser circuit 114 through the optical fiber 106. The M is a positive integer. The transmitting-end signal-splitting processor 108 is a digital signal processor or a gearbox circuit. The rest of FIG. 2 is the same as FIG. 1, which is not repeated here.

Figure 3:
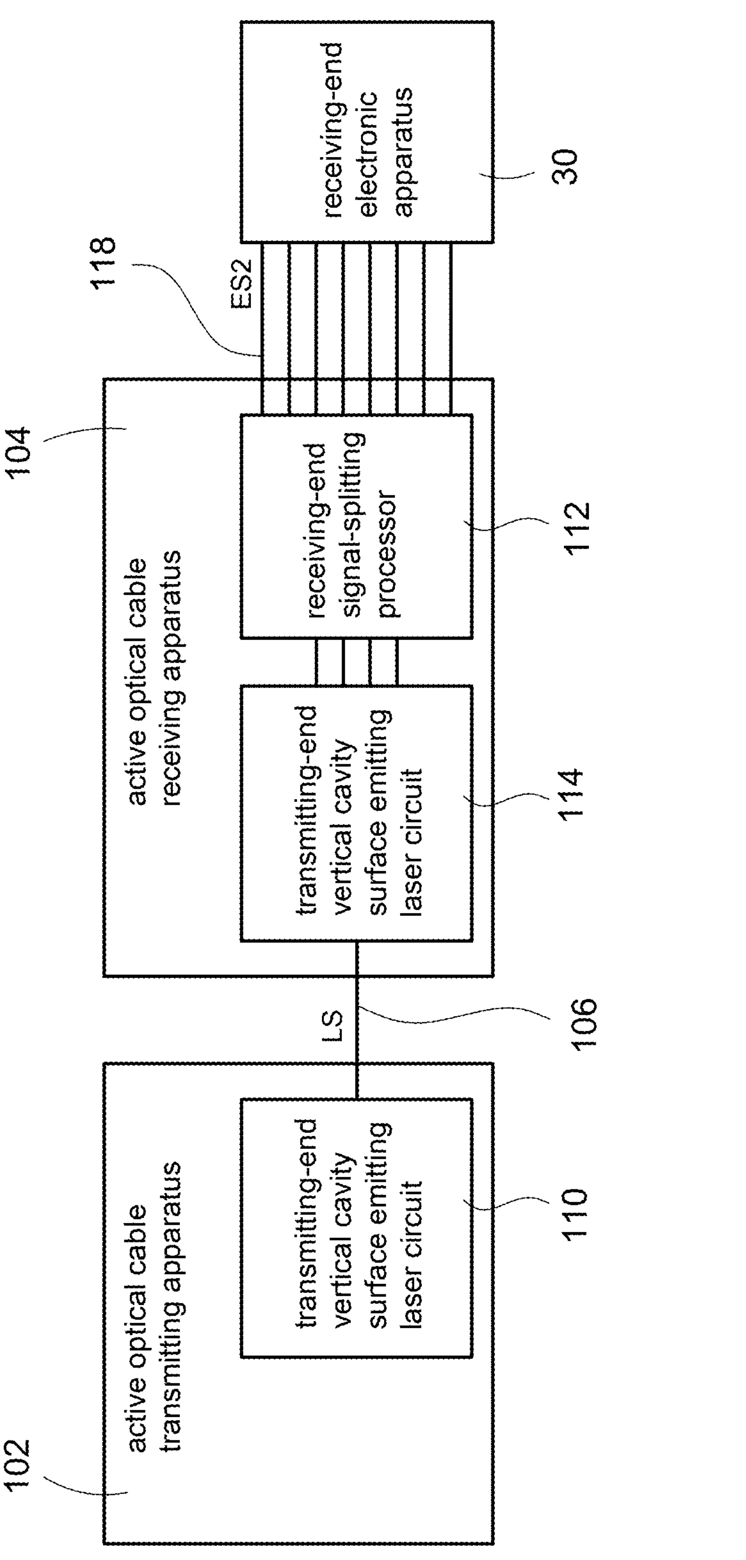
FIG. 3 shows a block diagram of the active optical cable receiving apparatus of the present disclosure.

FIG. 3 shows a block diagram of the active optical cable receiving apparatus 104 of the present disclosure. The active optical cable receiving apparatus 104 of the present disclosure is applied to a receiving-end electronic apparatus 30, an optical fiber 106, and an active optical cable transmitting apparatus 102. The active optical cable transmitting apparatus 102 includes a transmitting-end vertical cavity surface emitting laser circuit 110. The active optical cable receiving apparatus 104 includes a receiving-end signal-splitting processor 112 and a receiving-end vertical cavity surface emitting laser circuit 114. The receiving-end signal-splitting processor 112 is electrically connected to the receiving-end electronic apparatus 30. The receiving-end vertical cavity surface emitting laser circuit 114 is electrically connected to the receiving-end signal-splitting processor 112. The transmitting-end vertical cavity surface emitting laser circuit 110 is connected to the receiving-end vertical cavity surface emitting laser circuit 114 through the optical fiber 106.

The transmitting-end vertical cavity surface emitting laser circuit 110 transmits M optical signals LS to the receiving-end vertical cavity surface emitting laser circuit 114 through the optical fiber 106. The receiving-end vertical cavity surface emitting laser circuit 114 and the receiving-end signal-splitting processor 112 are configured to convert the M optical signals LS into N receiving-end electric signals ES2. The receiving-end signal-splitting processor 112 is configured to transmit the N receiving-end electric signals ES2 to the receiving-end electronic apparatus 30 through N receiving-end lanes 118. The M is a positive integer. The N is a positive integer. The M is not equal to the N. The receiving-end signal-splitting processor 112 is a digital signal processor or a gearbox circuit. The rest of FIG. 3 is the same as FIG. 1, which is not repeated here.

The advantage of the present disclosure is to reduce the cost and the power consumption of the active optical cable system 10. The present disclosure is about the data transmission technology in the field of the artificial intelligence applications, especially about the use of the active optical cable technology in the field of the artificial intelligence applications. The active optical cable of the present disclosure uses the multi-mode optical module VCSEL laser driver as the transceiver apparatus to replace the single-mode optical module EML (or DML) laser driver in order to reduce the system cost and the power consumption.

Although the present disclosure has been described with reference to the embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure.

What is claimed is:

1. An active optical cable system applied to a transmitting-end electronic apparatus and a receiving-end electronic apparatus, the active optical cable system comprising:

an active optical cable transmitting apparatus electrically connected to the transmitting-end electronic apparatus;

an active optical cable receiving apparatus electrically connected to the receiving-end electronic apparatus; and an optical fiber, wherein active optical cable transmitting apparatus is connected to the active optical cable receiving apparatus through the optical fiber, wherein the active optical cable transmitting apparatus comprises:

a transmitting-end signal-splitting processor electrically connected to the transmitting-end electronic apparatus; and a transmitting-end vertical cavity surface emitting laser circuit electrically connected to the transmitting-end signal-splitting processor, wherein the active optical cable receiving apparatus comprises:

a receiving-end signal-splitting processor electrically connected to the receiving-end electronic apparatus; and a receiving-end vertical cavity surface emitting laser circuit electrically connected to the receiving-end signal-splitting processor, wherein the transmitting-end vertical cavity surface emitting laser circuit is connected to the receiving-end vertical cavity surface emitting laser circuit through the optical fiber, wherein the transmitting-end signal-splitting processor is configured to receive M transmitting-end electric signals transmitted by the transmitting-end electronic apparatus through M transmitting-end lanes; the transmitting-end signal-splitting processor and the transmitting-end vertical cavity surface emitting laser circuit are configured to convert the M transmitting-end electric signals into M optical signals; the transmitting-end vertical cavity surface emitting laser circuit is configured to transmit the M optical signals to the receiving-end vertical cavity surface emitting laser circuit through the optical fiber; the receiving-end vertical cavity surface emitting laser circuit and the receiving-end signal-splitting processor are configured to convert the M optical signals into N receiving-end electric signals; the receiving-end signal-splitting processor is configured to transmit the N receiving-end electric signals to the receiving-end electronic apparatus through N receiving-end lanes; the M is a positive integer; the N is a positive integer; the M is not equal to the N.

2. The active optical cable system of claim 1, wherein the transmitting-end signal-splitting processor is a digital signal processor; the receiving-end signal-splitting processor is a digital signal processor.

3. The active optical cable system of claim 1, wherein the transmitting-end signal-splitting processor is a gearbox circuit; the receiving-end signal-splitting processor is a gearbox circuit.

4. The active optical cable system of claim 1, wherein the active optical cable transmitting apparatus is an octal small form factor pluggable transmission interface circuit; the active optical cable receiving apparatus is a quad small form factor pluggable-double density transmission interface circuit.

5. The active optical cable system of claim 4, wherein the M is smaller than the N.

6. The active optical cable system of claim 5, wherein the M is four; a first data transmission rate of the octal small form factor pluggable transmission interface circuit is 400 Gb/s; a first data splitting transmission rate of each of the M transmitting-end lanes is 100 Gb/s; the N is eight; a second data transmission rate of the quad small form factor pluggable-double density transmission interface circuit is 400 Gb/s; a second data splitting transmission rate of each of the N receiving-end lanes is 50 Gb/s.

7. An active optical cable transmitting apparatus applied to a transmitting-end electronic apparatus, an optical fiber, and an active optical cable receiving apparatus, the active optical cable receiving apparatus comprising a receiving-end vertical cavity surface emitting laser circuit, the active optical cable receiving apparatus comprising:

a transmitting-end signal-splitting processor electrically connected to the transmitting-end electronic apparatus; and a transmitting-end vertical cavity surface emitting laser circuit electrically connected to the transmitting-end signal-splitting processor, wherein the transmitting-end vertical cavity surface emitting laser circuit is connected to the receiving-end vertical cavity surface emitting laser circuit through the optical fiber, wherein the transmitting-end signal-splitting processor is configured to receive M transmitting-end electric signals transmitted by the transmitting-end electronic apparatus through M transmitting-end lanes; the transmitting-end signal-splitting processor and the transmitting-end vertical cavity surface emitting laser circuit are configured to convert the M transmitting-end electric signals into M optical signals; the transmitting-end vertical cavity surface emitting laser circuit is configured to transmit the M optical signals to the receiving-end vertical cavity surface emitting laser circuit through the optical fiber; the M is a positive integer.

8. The active optical cable transmitting apparatus of claim 7, wherein the transmitting-end signal-splitting processor is a digital signal processor or a gearbox circuit.

9. An active optical cable receiving apparatus applied to a receiving-end electronic apparatus, an optical fiber, and an active optical cable transmitting apparatus, the active optical cable transmitting apparatus comprising a transmitting-end vertical cavity surface emitting laser circuit, the active optical cable receiving apparatus comprising:

a receiving-end signal-splitting processor electrically connected to the receiving-end electronic apparatus; and a receiving-end vertical cavity surface emitting laser circuit electrically connected to the receiving-end signal-splitting processor, wherein the transmitting-end vertical cavity surface emitting laser circuit is connected to the receiving-end vertical cavity surface emitting laser circuit through the optical fiber, wherein the transmitting-end vertical cavity surface emitting laser circuit transmits M optical signals to the receiving-end vertical cavity surface emitting laser circuit through the optical fiber; the receiving-end vertical cavity surface emitting laser circuit and the receiving-end signal-splitting processor are configured to convert the M optical signals into N receiving-end electric signals; the receiving-end signal-splitting processor is configured to transmit the N receiving-end electric signals to the receiving-end electronic apparatus through N receiving-end lanes; the M is a positive integer; the N is a positive integer; the M is not equal to the N.

10. The active optical cable receiving apparatus of claim 9, wherein the receiving-end signal-splitting processor is a digital signal processor or a gearbox circuit.

* * * * *